(12) United States Patent
Galstian (10) Patent No.: US 11,561,450 B2
(45) Date of Patent: Jan. 24, 2023

(54) LIQUID CRYSTAL BEAM CONTROL

(71) Applicant: LensVector Inc., San Jose, CA (US)

(72) Inventor: Tigran Galstian, Quebec (CA)

( * ) Notice: Subject to any disclaimer, the term of this patent is extended or adjusted under 35 U.S.C. 154(b) by 432 days.

(21) Appl. No.: 16/466,868

(22) PCT Filed: Dec. 6, 2017

(86) PCT No.: PCT/CA2017/051476
§ 371 (c)(1),
(2) Date: Jun. 5, 2019

(87) PCT Pub. No.: WO2018/102922
PCT Pub. Date: Jun. 14, 2018

(65) Prior Publication Data
US 2021/0109419 A1   Apr. 15, 2021

Related U.S. Application Data

(60) Provisional application No. 62/430,616, filed on Dec. 6, 2016.

(51) Int. Cl.
*G02F 1/29*      (2006.01)
*F21K 9/233*    (2016.01)
(Continued)

(52) U.S. Cl.
CPC ............... *G02F 1/29* (2013.01); *F21K 9/233* (2016.08); *F21K 9/65* (2016.08); *F21V 14/003* (2013.01); *F21V 23/045* (2013.01); *G02F 1/13306* (2013.01); *H04B 10/11* (2013.01); *H04B 10/50* (2013.01); *H04B 10/60* (2013.01); *F21Y 2115/10* (2016.08); *G02F 2203/24* (2013.01)

(58) Field of Classification Search
CPC .... G02F 1/29; G02F 1/13306; G02F 2203/24; F21K 9/233; F21K 9/65; F21V 14/003; F21V 23/045; F21Y 2115/10; H04B 10/11; H04B 10/50; H04B 10/60
See application file for complete search history.

(56) References Cited

U.S. PATENT DOCUMENTS 5,748,813 A    5/1998  Cassidy et al.
6,292,280 B1   9/2001  Boffi et al.
(Continued)

FOREIGN PATENT DOCUMENTS

JP    2004221747 A    8/2004
WO    00/04660 A2    1/2000
(Continued)

OTHER PUBLICATIONS

International Application No. PCT/CA2017/051476 International Preliminary Report on Patentability Chapter II dated Mar. 15, 2019.
(Continued)

*Primary Examiner* — Nathanael R Briggs
(74) *Attorney, Agent, or Firm* — Anglehart et al.

(57) ABSTRACT

Liquid crystal (LC) beam modulation devices are applied to lighting control or to optical wireless communications to improve performance of lighting or communications. A flexible optical network using LC beam modulation and common control of beam intensity and solid angle of beams are also described.

20 Claims, 8 Drawing Sheets

(51) Int. Cl.
  *F21K 9/65* (2016.01)
  *F21V 14/00* (2018.01)
  *F21V 23/04* (2006.01)
  *H04B 10/11* (2013.01)
  *H04B 10/50* (2013.01)
  *H04B 10/60* (2013.01)
  *G02F 1/133* (2006.01)
  *F21Y 115/10* (2016.01)

(56) References Cited

U.S. PATENT DOCUMENTS

| | | | |
|---|---|---|---|
| 6,690,888 | B1 | 2/2004 | Keller et al. |
| 7,079,774 | B2 | 7/2006 | Sidorovich et al. |
| 7,218,302 | B2 | 5/2007 | Ide |
| 7,309,965 | B2 | 12/2007 | Dowling et al. |
| 7,969,639 | B2 | 6/2011 | McNie et al. |
| 8,103,167 | B2 | 1/2012 | Tidhar |
| 2004/0057730 | A1 | 3/2004 | Littlejohn et al. |
| 2004/0091269 | A1 | 5/2004 | Green et al. |
| 2004/0208602 | A1 | 10/2004 | Plante |
| 2008/0138077 | A1 | 6/2008 | Stretton |
| 2008/0284924 | A1 | 11/2008 | Hofmann et al. |
| 2009/0310976 | A1 | 12/2009 | Nakagawa et al. |
| 2013/0293722 | A1 | 11/2013 | Chen |
| 2014/0161466 | A1 | 6/2014 | Riza |
| 2015/0023019 | A1 | 1/2015 | Chen |
| 2015/0252984 | A1 | 9/2015 | Van Bommel et al. |
| 2015/0378088 | A1 | 12/2015 | Stormberg et al. |
| 2016/0191158 | A1 | 6/2016 | Aoyama et al. |
| 2016/0302275 | A1 | 10/2016 | Newton et al. |
| 2022/0018961 | A1* | 1/2022 | O'Keeffe ............ G01S 17/10 |

FOREIGN PATENT DOCUMENTS

| | | |
|---|---|---|
| WO | 2015/168218 A2 | 11/2015 |
| WO | 2016/082031 A1 | 6/2016 |
| WO | 2017/041167 A1 | 3/2017 |

OTHER PUBLICATIONS

International Application No. PCT/CA2017/051476 International Search Report dated Mar. 8, 2018.
International Application No. PCT/CA2017/051476 Search Strategy dated Mar. 8, 2018.
International Application No. PCT/CA2017/051476 Written Opinion of the International Searching Authority dated Mar. 8, 2018.
EP17877883 Extended European search report and search opinion dated Jun. 29, 2020.
Gomez, A. et al.; "Beyond 100-GB/s Indoor Wide Field-of-View Option Wireless Communications"; IEEE Photonics Technology Letters, vol. 27, No. 4, pp. 367-370; Feb. 15, 2015.
Shao, S., et al.; "Design and analysis of a visible-light-communication enhanced WiFi system"; IEEE/OSA Journal of Optical Communications and Networking, vol. 7, Issue 10, pp. 960-973; Oct. 7, 2015.
Ashok, Ashwin, et al. "Challenge: Mobile optical networks through visual MIMO." MobiCom 10: Proceedings of the sixteenth annual international conference on Mobile computing and networking, Sep. 2010, pp. 105-112, https://doi.org/10.1145/1859995.1860008.
Examination report dated Oct. 14, 2021 from related European application No. EP17877883.3.

* cited by examiner

LIQUID CRYSTAL BEAM CONTROL

This application claims priority of U.S. provisional patent application 62/430,616 filed Dec. 6, 2016, the content of which is incorporated by reference.

TECHNICAL FIELD

The present disclosure relates to applications of liquid crystal (LC) beam control devices, and, in certain aspects, to Light Fidelity (Li-Fi) wireless communication technology and smart lighting.

BACKGROUND

Beam shaping and/or steering using LC is known in the scientific literature, however, it is not presently available in commercial products.

Li-Fi is an emerging technology that is commercially available. Li-Fi can make use of ambient light sources, such as LED lamps that are ceiling mounted as flood beam lights. These Li-Fi devices can act as access points for Li-Fi client devices within the range of the beam of the access point. Li-Fi communication is bidirectional, and the light source is matched with a light detector that may use the same beam optics as the light source.

Smart lighting is also an emerging technology that suggests the incorporation of detection and imaging functionalities to optimize light parameters (such as timing, dimming, color temperature, etc.).

SUMMARY

Applicant has found that LC devices can efficiently add divergence to a light source beam by about 45 degrees. Applicant has also found that simple LC devices can provide beam direction or steering control of about +/−10 degrees.

Applicant has found that such LC devices can be of particular use when applied to Li-Fi light sources and to smart lighting applications.

Applicant has found that an LC controllable beam divergence device can be combined with a Li-Fi access point light source to shape the access point beam to control a quality, robustness and security of the Li-Fi communication, for example inclusion/exclusion within the beam, or signal level of a Li-Fi client device and/or another Li-Fi access point.

Applicant has found that an LC controllable beam divergence device can be combined with a light source intensity controller (dimmer) so that the beam intensity can be automatically controlled with beam divergence so that the beam brightness is controlled. This can prevent a beam spot that remains within a desired range of brightness so as to avoid a beam spot that is too bright or too dim. Consequently, unnecessary illumination will be reduced and corresponding comfort and energy saving will be improved.

For example, a light source that is provided with a dimming control and an LC controllable beam divergence device can be configured to provide a lowest beam divergence when a small area must be illuminated; the dimming control being then set to the lowest brightness, and as the dimming control increases the brightness of the light source, the spot beam could become too bright according to the desired range of brightness. At this time, the LC controllable beam divergence device can be controlled to increase divergence of the spot beam. In this way, the light source dimming control is coupled to the beam divergence control to provide for a smooth transition of beam growth corresponding to the light source intensity. The beam brightness can be essentially stable as the light source's power is varied using the dimming control within at least a portion of its control range. The brightness set point can be established and kept constant while control is performed using the dimming control.

It will be appreciated that such beam divergence control provides improved lighting effects that avoid too bright illumination of objects, and that avoids a fading of the beam brightness that causes a loss of a desired illumination effect. It will also be appreciated that electrical power is saved when the beam divergence is reduced to a smaller spot size and the light source power output is reduced accordingly.

In some embodiments, LC devices are provided that can control light beam properties by steering in a given direction or by symmetrically broadening a light beam providing a dynamic light beam shaping and modulation devices. There are many possible applications of such technology, such as reducing the inventory of luminaires (or lighting fixture) by allowing the dynamic adjustment of their spot size. Another application may be the attraction of attention when changing the spot size in fashion shops, etc. However, the use of such devices may also enable more efficient use of lighting.

For example, one application is in energy savings. A user's needs for illumination may change depending upon the time of day, the presence of people in a room, type of activities (social setting, movie watching, gaming, etc.), etc. The proposed devices providing an adjustable illumination spot size (area A) which can be changed dynamically (by using client's LC modulation elements) and providing dynamic dimming (changing the density of light power P or its intensity I=P/A) drivers can combine these two functions (control of lighting area A and dimming of its power P) to ensure optimal (required) level of illumination intensity $I_{opt}$. Thus, if only a small area A must be illuminated, then the power P may be dimmed to maintain the same level $I_{opt}$ over that area providing significant energy savings.

For example, another application is in better contrast and security. The same concept of optimal illumination intensity ($I_{opt}$=P/A) may also be used to improve the quality of acquisition of images (photo or video). Illumination systems can be provided, which use a relatively simple camera system to identify the "object of interest" or the "type of activities" taking place in the area of illumination. In this application, the level of illumination $I_{opt}$ (corresponding to the type of activity detected) may be maintained preferably in a "zone of interest". First, this will allow a better image/video acquisition (if mainly the "object of interest" is illuminated and not its environment). Secondly, in a Li-Fi application, the Li-Fi system is integrated into the illumination LED source. LiFi, as used herein, means free-space optical data communication and is not limited to any specific optical data communication protocol. Such an illumination system would also provide better security since, instead of "broadcasting" the information at large, the Li-Fi signal can be preferably delivered to the "object of interest" by controlled light beam steering and appropriately controlled light beam broadening. If a Li-Fi detection system is included into the LED illumination device, then the signal can be received (recorded) with better contrast (in signal to noise ratio terms).

Liquid crystal (LC) beam modulation devices are applied to lighting control or to optical wireless communications to improve performance of lighting or communications. A flexible optical network using LC beam modulation and common control of beam intensity and solid angle of beams (beam area) are also possible.

In a Li-Fi Internet of Things (IoT) application: a network of LEDs (or other type of) light sources can contain routers, each with its own address. The client's dynamic beam shaping elements can be added to each of router/LED component, then by stretching light in one or other (perpendicular) direction the LiFi signal can dynamically re-routed for IoT applications, for example, to avoid a given area (damaged or compromised), to "guide" users to specific side of the room. For example, crowd control rules can include: no Li-Fi (data connection) in a bathroom where cameras are not appreciated, full Li-Fi (data connection) in a waiting line/room under full security camera surveillance, no Li-Fi (data connection) at the service counter in the same room so people pay attention to the agent and full Li-Fi (data connection) for the agent behind the desk in the same room. This might bring lot of advantages (security, flexibility, etc.) to increase the security by reducing the IoT broadcasting area as desired.

For example, another application is in better lighting comfort. The same concept of optimal illumination intensity ($I_{opt}=P/A$) can be also used to improve the comfort zone for normal or some special activities. For example, this includes conference presentations (where the screen must be less illuminated while the presenter needs to be illuminated), dinner activities, etc. The power P of illumination and its size A may be varied independently of simultaneously to maintain an optimal value of $I_{opt}$ for the type of activities. In practice, such devices include a light source forming an initial beam (LED), a controllable LC beam shaping and modulation element (our client's element), a device controller with inputs (data, sensors, master controller, etc.), camera/presence sensor/scanner and firmware/software logic to detect conditions and adapt the beam shaping and modulation element. Other integration aspects are dependent on application. Some form of mechanical gross manual pointing can be provided while fine pointing can be provided by the same beam shaping LC element, for example based on presets. The master controller can employ an app at least for defining presets, preferably for directed control (presentation remote, conference table console).

BRIEF DESCRIPTION OF THE DRAWINGS

The invention will be better understood by way of the following detailed description of embodiments of the invention with reference to the appended drawings, in which.

DETAILED DESCRIPTION

Figures 1A, 1B:
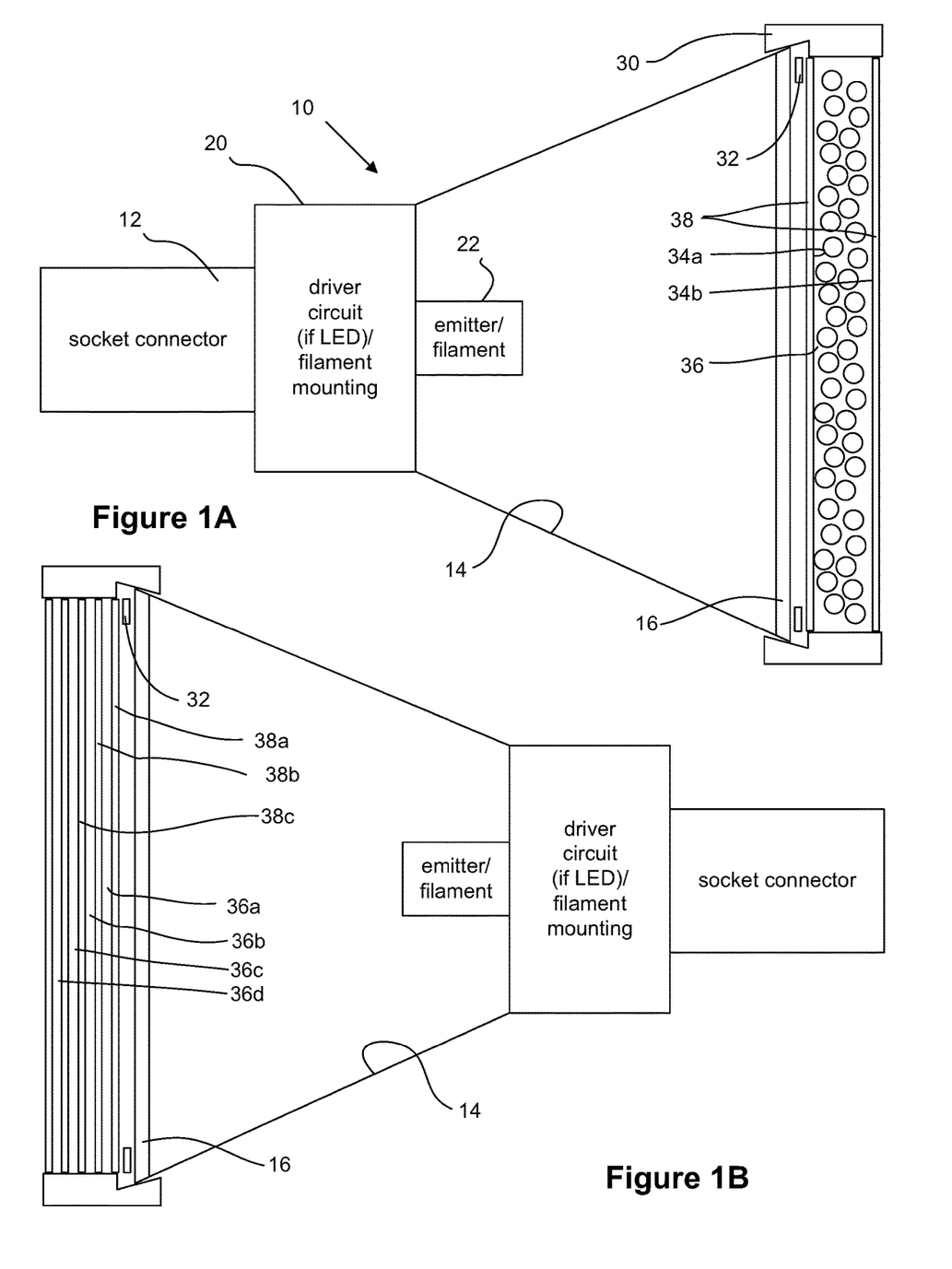
FIG. 1A is a schematic side sectional view of a light source for producing a spot beam with an LC variable beam control element using a polymer-dispersed liquid crystal (PDLC) structure.
FIG. 1B is a schematic side sectional view of a light source for producing a spot beam with an LC variable beam control element using a number of nematic LC layers.

FIGS. 1A and 1B illustrate an example of a spot beam light source or lamp 10 equipped with an LC beam shaping device 30. The device 30 can be a separate and detachable component (as shown in the example), or it can be integrated into the source 10. The source 10 has a light emitter 22, namely a light emitting diode (LED) element or another light emitter such as an incandescent filament light bulb or a fluorescent light source. In embodiments where the emitter 22 is a Li-Fi transmitter, fast intensity modulation is important, and LED elements are preferred.

The emitter 22 is connected to a driver circuit 20 (or an electrical connector in the case of a filament light bulb), and the light source 10 can be connected to a conventional light fixture using a connector 12, such as a socket connector. In some embodiments described herein, the light source 10 can be part of a device, such as a Li-Fi access point or node device, such that it is not a stand-alone light source. While many of the embodiments described herein relate to a light source that provides architectural or living space visible lighting, it will be appreciated that the LC beam control devices can be configured to control non-visible light sources, for example in the near infrared. It will be appreciated that both visible and non-visible sources can be modulated by the same LC beam control elements so that users can see the beam shape where Li-Fi is available.

In the examples of FIGS. 1A and 1B, the light source 10 includes reflective optics 14 for focussing light from the emitter 22 into a spot beam passing through an aperture lens or cover 16. It will be understood that beam creation optics can involve refractive optics, such as conventional lenses or Fresnel lenses, alone or a combination of reflectors and refractive optics. The light emitter 22 in many LED light sources comprises a number of smaller LED elements, and in some cases the optics for beam creation are arranged separately for each of the smaller LED elements.

The spot beam created by a light source 10 need not be a perfectly collimated beam, and indeed, most conventional spot beam light sources 10 used in architectural lighting provide a beam divergence of between +/−3 degrees (6°, measured as full width at half maximum of light intensity distribution, FWHM) to about +/−10 degrees (20°, FWHM). When a broader beam is desired, a flood beam light source can be used instead of a spot beam light source. A conventional flood beam light source has beam creating optics like a spot beam light source, however, it has a beam divergence that is typically between +/−15 (30°, FWHM) to +/−35 degrees (70°, FWHM). In architectural lighting, spot beam and flood beam light sources are typically mounted in a ceiling for providing illumination of the floor, however, they can be arranged to light walls and specific furniture or artwork as well.

The LC beam control devices 30 associated with light sources 10 illustrated in FIGS. 1A and 1B provide a variable amount of additional beam divergence from about 0 to about +/−25 degrees (50°, FWHM). This essentially allows control over the light source beam to be changed from a spot beam to a flood beam.

The LC beam control device 30 in the example of FIG. 1A is a polymer dispersed liquid crystal (PDLC) material 36. Such a material 36 is known in the art and need not be fully explained here. The material 36 comprises inclusions or droplets of LC in a polymer matrix. Transparent electrodes 34a and 34b can be driven by an electric drive signal to create an electric field across the material 36 that changes the LC orientation from random to aligned, as is known in the art. The material 36 can be contained by substrates 38 in some cases. For example, the matrix material can have an index of refraction that matches the LC when aligned in one direction (for example in the direction of the beam propagation) so that the material 36 is transparent, and otherwise the contrast in index of refraction between the LC and the matrix causes beam scattering (the material 36 is diffusive) in all (mainly forward) directions. The divergence of the beam is thus increased almost symmetrically in the transverse (perpendicular to original propagation) directions. Electrical voltage for driving the electrodes 34 can be provided by a photovoltaic device (PV) 32 or an external source 24 (see FIG. 3). The PV device 32 can be provided around the edge of the beam so as to minimally interfere with the beam. The electrical power required for driving a PDLC device 36 is typically a few milliwatts for the aperture of a conventional spot beam source.

Figure 2A:
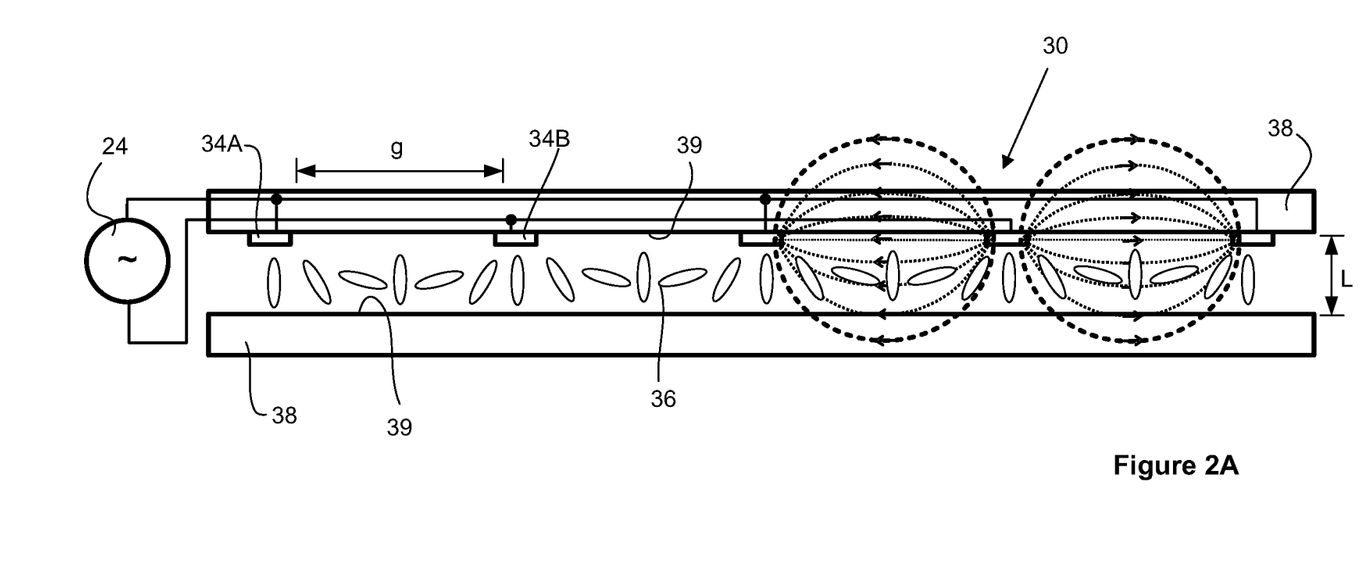
FIG. 2A is a schematic sectional view of a portion of an LC variable beam control element using electrodes on one substrate for in-plane control electric fields.
Figure 2B:
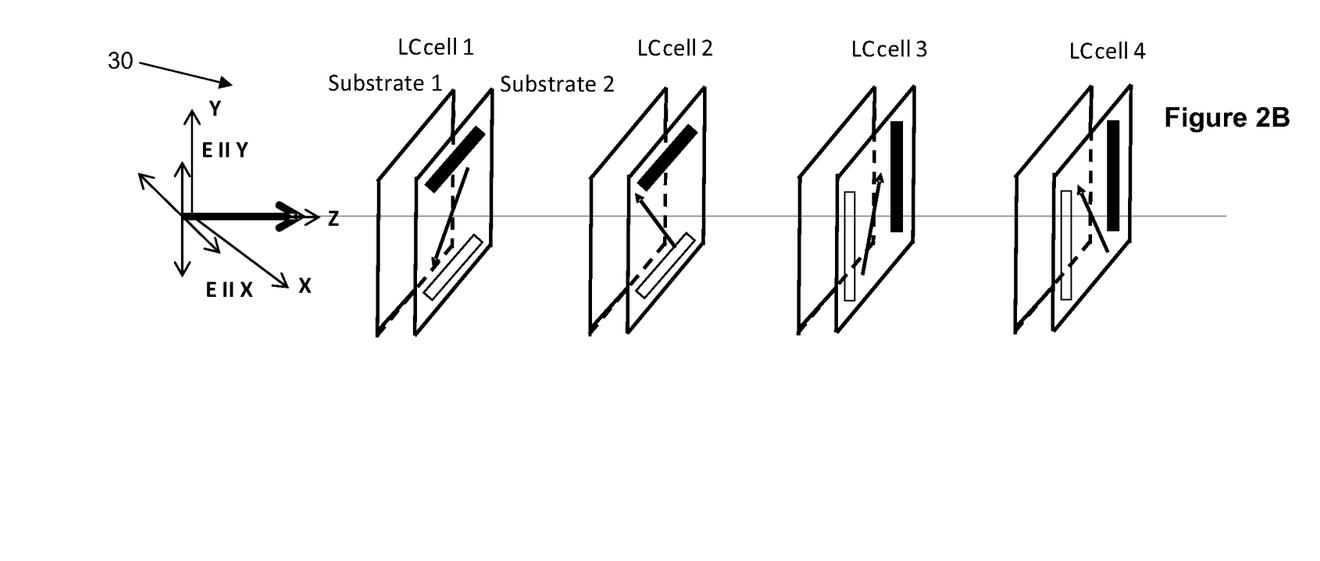
FIG. 2B is a schematic view of four LC cells of a configuration of FIG. 2A of different electrode and planar orientation of liquid crystal for the four cells.

The LC beam control device 30 in the example of FIG. 1B is based on nematic LC cells as better illustrated in FIGS. 2A and 2B. Details of such a device are given in Applicant's published PCT patent application WO2017/041167 published on 16 Mar. 2017. FIG. 2A shows the basic cell architecture that comprises substrates 38 having a gap filled with LC 36 that is typically oriented in the ground state by a rubbed alignment layer 39 for planar orientation, namely with the liquid crystal molecules aligned at a small pre-tilt angle with respect to the substrates. Electrodes 34A and 34B are patterned (interdigitated) parallel strip electrodes extending into the page. The effect of applying an electric field is to produce a spatial modulation of the LC molecular orientation that forms approximately a cylindrical lens as a result of the change in the index of refraction due to orientation. The optical modulation due to that approximately cylindrical lens acts essentially only on one polarization, and light is essentially broadened in one plane (the plane that is perpendicular to the electrode lines). In this case, light intensity distribution may be increased (stretched) in the desired direction (in contrast to the previous case of PDLC). However, as illustrated in FIG. 2B, four such cells can be arranged to modulate light of two polarizations in two directions, creating thus elliptical or rectangular light intensity distribution patterns.

While the LC beam control device 30 described above performs only beam divergence control, it will be appreciated that LC devices can also perform beam steering, for example as described in Applicant's published PCT patent application WO2016/082031 published 2 Jun. 2016.

Figure 3:
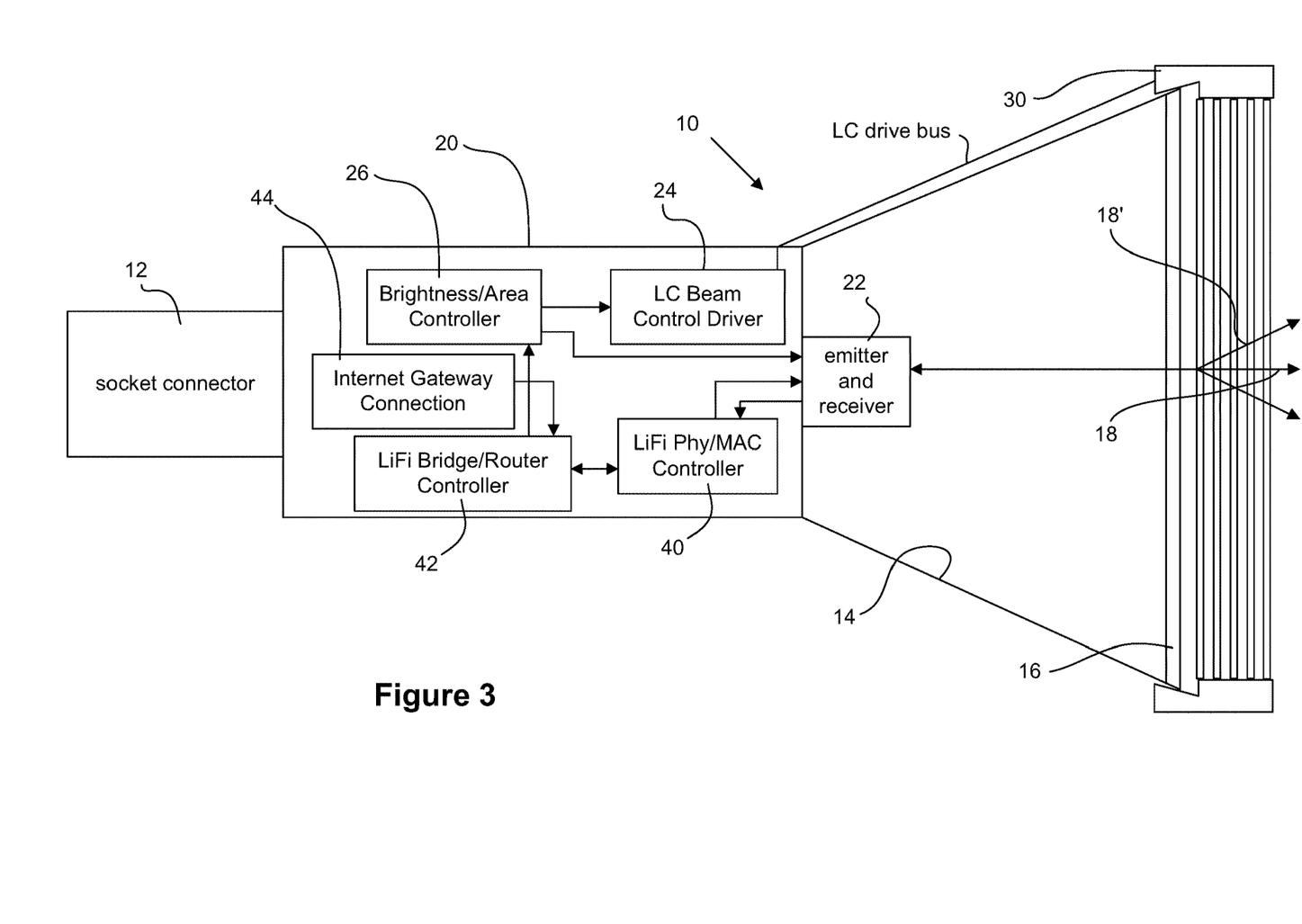
FIG. 3 is a schematic sectional view of a Li-Fi light source for producing a spot beam with an LC variable beam control element.

FIG. 3 illustrates a Li-Fi device 10 combined with an LC beam control device 30. Li-Fi data transceivers are known in the art and need not be fully explained here. The light emitter 22 emits visible light and can comprise an LED emitter. The emitter 22 also comprises a light detector or receiver as is known in the Li-Fi art. Optics 14 can also be provided for creating from the light emitted by the emitter 22 a spot beam 18. The LC beam control device 30 can, as described above, add divergence to the beam 18 to provide a flood beam 18'.

Figure 4:
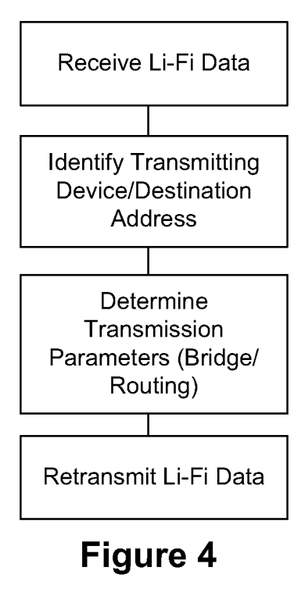
FIG. 4 is a flow diagram illustrating the steps involved in Li-Fi data bridge or routing data transmission in a network of Li-Fi devices of the type shown in FIG. 3.
Figure 7:
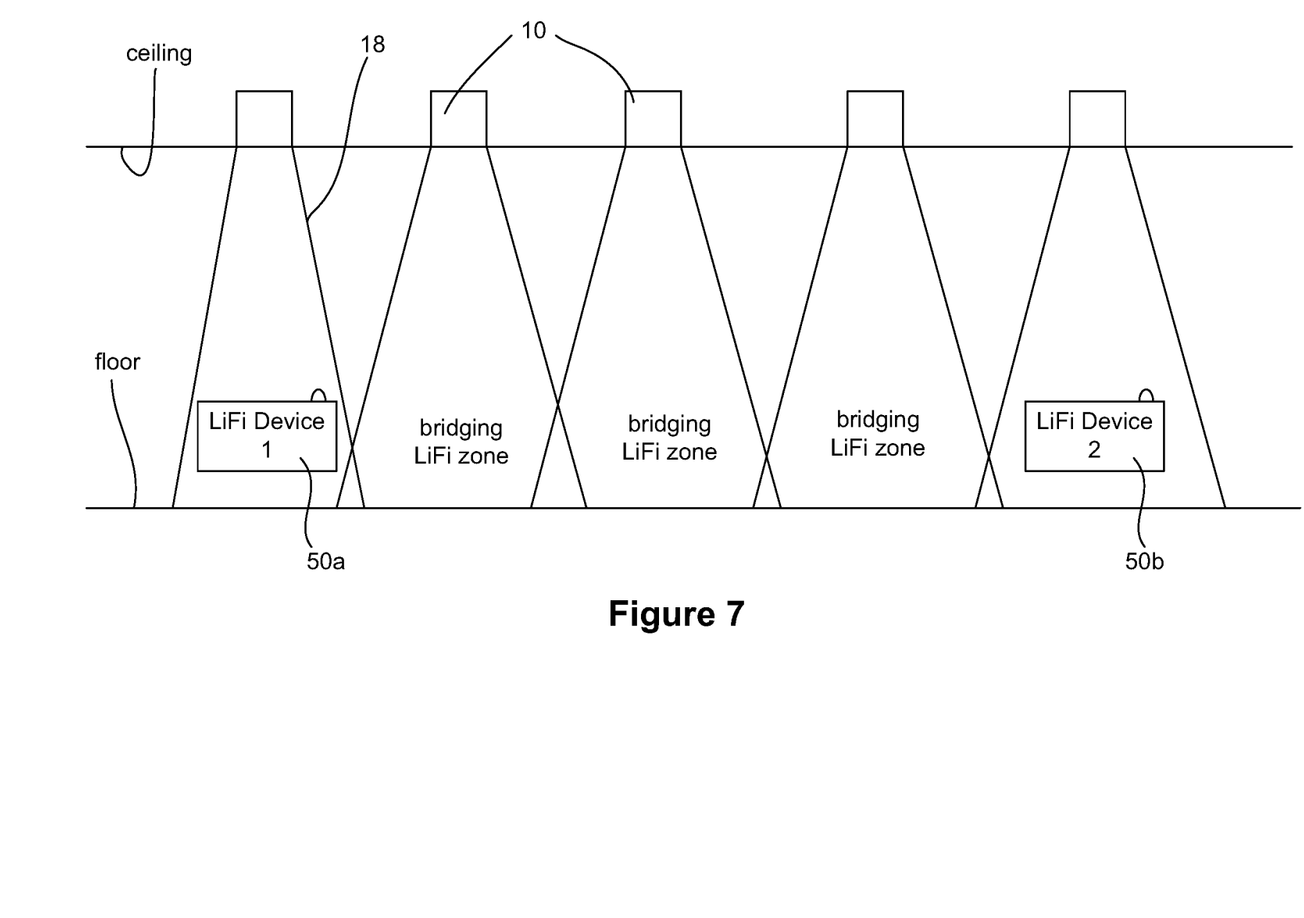
FIG. 7 is a schematic illustration of an installation of multiple Li-Fi light sources that are ceiling-mounted and perform bridging of Li-Fi communications in an area between them using light reflected from a floor and/or floor-mounted objected in the area with two Li-Fi devices located within the area.
Figure 8:
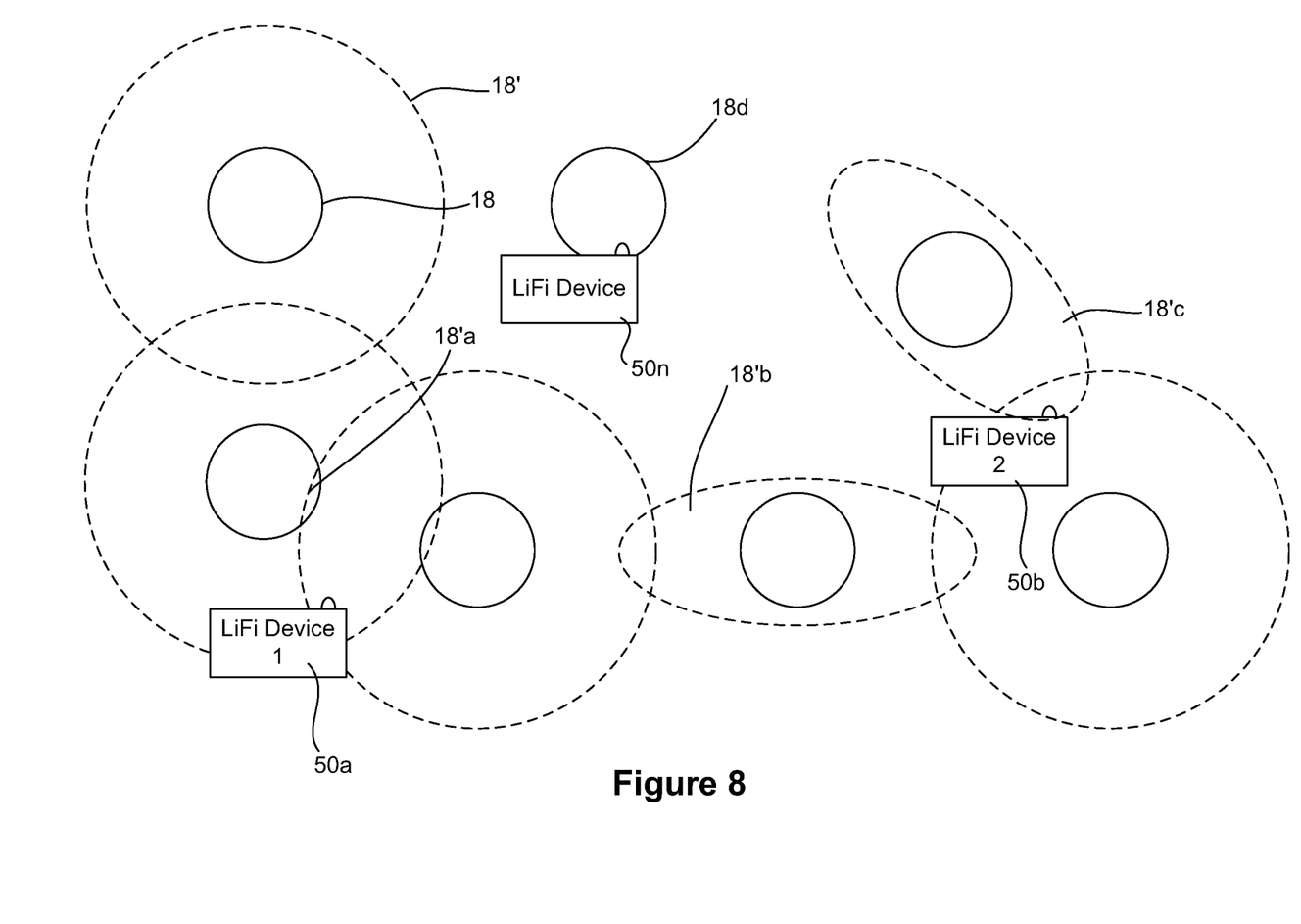
FIG. 8 is a plan view of beams from multiple Li-Fi light sources that are modulated to be spot beams or wider flood beams for bridging of Li-Fi communications in an area between them using light reflected from a floor and/or floor-mounted objected in the area with two Li-Fi devices located within the area.

The Li-Fi components can comprise a phy/MAC layer controller 40, a bridge/router controller 42 and a network gateway connection component 44. The controller 40 is known to those skilled in the art of Li-Fi, and it serves to modulate the emitted light at emitter 22 and to detect modulations in detected light in the receiver 22. The controller 42 is based on known Li-Fi components, namely routing of Li-Fi data, however, controller 42 is adapted to bridge Li-Fi data from one device 10 to another. This means that data received is analyzed to see if it identifies that the data is from a known Li-Fi device 10 within the network, and if so, the data is re-transmitted to other connected nodes 10 in the network. This is illustrated in FIG. 4. The network physical installation is illustrated in FIGS. 7 and 8 and will be described in greater detail below.

Controller 42 is called a Li-Fi bridge herein when it serves to establish a local network using multiple devices 10. It will be appreciated that because the interconnection between devices 10 is used by the same emitter/receiver beams 18, routing of data can be involved. If the Li-Fi transceiver 22 used distinct wavelengths for communicating with neighboring nodes, then there would be different physical layer channels connecting the nodes 10 together. In this case, controller 42 could, as with an Ethernet bridge, transmit data received on one physical layer to another physical layer without address inspection in a true "bridge" mode. As with color geographic maps of states or countries, no more than four colors or wavelengths would be required to allow for any arrangement of node devices 10 to communicate with devices within their own beams 18 and any other neighboring beam. Alternatively, the optical wireless communications protocol can allow for devices 10 to repeat or echo communications they receive the first time. This would require each device 10, and more specifically controller 42 to identify packets (or other formats of data) to know if it is the first time they receive the communication. This can be done, for example, by providing a packet ID and a sender ID.

Controller 42 is also adapted to communicate to brightness/area controller 26 a value representing the signal strength of a received signal of at least one connected node 10 in the network. This received signal strength is initially detected by controller 40 and is communicated to controller 42. It will be appreciated that it can be communicated directly from controller 40 to controller 26 if desired. The WAN gateway 44 is an optional component. It can be connected to a WAN (or other network) by WiFi, Bluetooth or powerline Ethernet, for example. It can allow network connectivity to be provided to controller 42 so that Li-Fi data from nodes on the Li-Fi network can communicate with nodes on the WAN.

Figure 5:
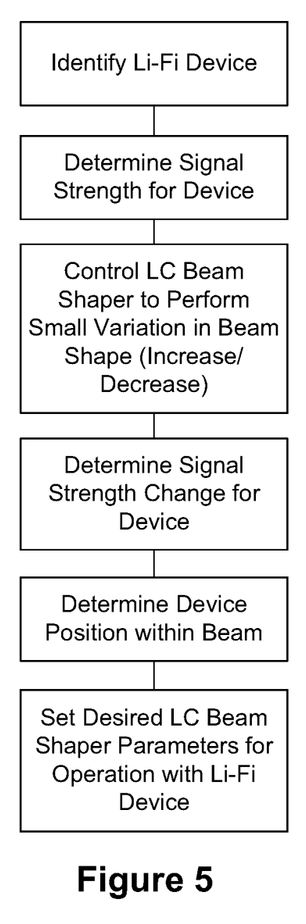
FIG. 5 is a flow diagram illustrating the steps involved in beam shape modulation control in a Li-Fi device to improve Li-Fi transmission.
Figure 6:
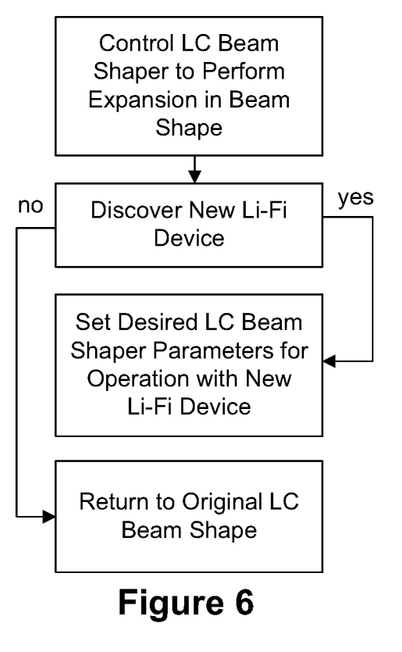
FIG. 6 is a flow diagram illustrating the steps involved in expanding a beam shape to establish a Li-Fi connection.

Brightness/Li-Fi area controller 26 can perform a number of functions. As illustrated in FIG. 6, it can periodically signal to the LC beam control signal driver 24 to expand the beam to a full flood while increasing the intensity of the emitter 22. Then, it can determine if a new node within the Li-Fi network is detected. The new node device can be a Li-Fi device 50*a* (see FIG. 7 or 8) or it can be another device 10. If a new node is detected, then the beam shape is controlled to include the new node within the beam. Instead of performing this discovery operation automatically and periodically, the discovery operation can be performed alternatively in response to an external command or instruction. As illustrated in FIG. 5, controller 26 can also receives a signal strength value from controller 42. In response, controller 26 can signal to controller 24 to change the beam shape. If the signal strength is ample, it may be desirable to reduce the beam size and concomitantly reduce emitter 22 power so as to reduce power consumption. If the signal strength is weak, it may be desirable to increase beam size and increase emitter 22 power to provide better Li-Fi signal to the node in question. When the device 30 can shape the beam 18 independently in two directions (as is the case with the architecture of FIG. 2B), the controller 26 can signal driver 24 to change beam shape in each direction independently to find the desired beam shape change to suit the network.

As described above, the devices 10 can form a Li-Fi network by overlapping beams 18 as illustrated in FIG. 7. Each device 10 can be powered from a conventional light socket with no other data interconnection, unless otherwise desired.

Even if the beams 18 are fixed optics flood beams without including LC beam shaping devices 30, it will be appreciated that Li-Fi light source nodes 10 can advantageously form a Li-Fi network interconnecting device 50*a* to device 50*b* as in the example of FIG. 7 without the devices 10 needing to include gateways 44. In these embodiments, WAN connectivity can be provided from a WAN gateway device located within one or more of beams 18 from the ceiling mounted devices 10. Such a gateway device could be a dedicated device having a wired or wireless WAN or LAN connection (connected to a WAN), or it could be a client device that shares its LAN/WAN connection.

The devices 10 can be configured to shape their beams 10 to allow for Li-Fi interconnection from device 10 to device 10 in the network. In this way, device 50*a* can communicate with device 50*b*. The spot beams 18 illustrated in FIG. 8 would not overlap were it not for devices 30 that create beams 18'. In some cases, two devices 10 must broaden beams 18 into broader flood beams 18' for the devices 10 to communicate together. In the case of beam 18'*a*, it overlaps with the spot beam of its neighbor to the left such that it can always communicate with it even if its beam shape is reduced to a spot. In the case of beam 18'*b*, it was expanded mostly in one direction to overlap with the flood beams of its two neighbors, while illuminating the smallest area. This can increase the security/privacy of the Li-Fi network in addition to reducing visible illumination when visible light is used.

The configuration can be done using a network configuration controller (not shown), for example using a computer having a user interface that allows a user to send control signals to each LC beam modulator controller to adjust the beam parameters to have the desired topology as illustrated in FIGS. 7 and 8.

When beam shaping is controllable in one direction, it can be important to be able to select the direction. The device 30 of FIG. 2B can broaden a beam in the X or in the Y direction, and would need to be rotated to broaden a beam 18 into beam 18'*b* or 18'*c*. Such a rotation can be performed manually by rotating the device 30 in the case that the device 30 has a rotatable mounting.

It will be appreciated that when there is no device 50 within the spot beam 18*d* of a device 10, it can keep its beam as a spot beam. When a device 50*n* appears within spot beam 18*d*, the device 10 can broaden beam 18*d* to an appropriate shape 18*d'* (not shown) to overlap, for example with beam 18' or 18'*c*, to link with one or more other devices 10 in the network and give the new device 50*n* connection to the Li-Fi network.

Figure 9:
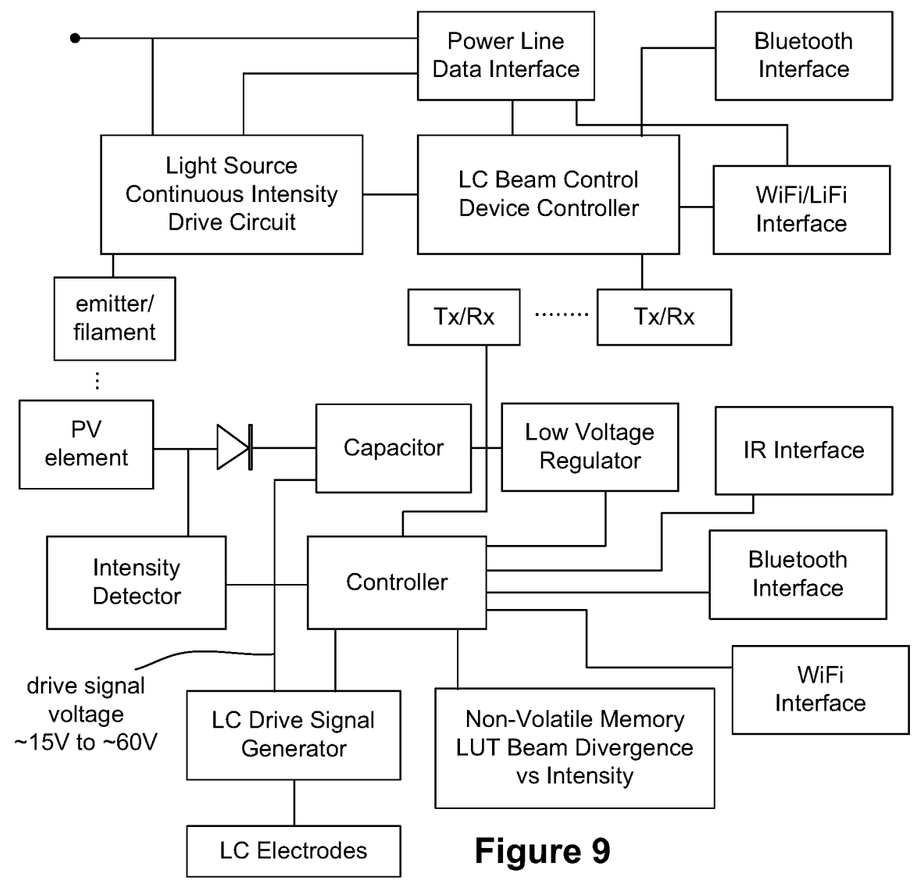
FIG. 9 is a schematic block diagram of a LC beam modulation device configured to be controlled by an intensity of the light source to provide more uniform beam brightness, or alternatively configured to control light source intensity of the light source in accordance with beam shaping parameters of the LC beam modulation device.

In the embodiment of FIG. 9, the light source has controllable intensity and beam shape, but does not include Li-Fi operation. Intensity control and/or beam shape control can be controlled using one or more of a variety of means, such as Bluetooth, powerline data, WiFi, infrared, etc. Intensity control can also be provided by the main connection directly using a conventional dimmer switch.

It will be appreciated that an LC beam control device has a beam modulation transfer function that is specific to its design and the combination of a light source and an LC beam control device provides a controllable beam intensity spatial modulation pattern that specific to the combination. The visual effect of a beam in architectural lighting depends on the relative brightness of the beam, the beam shape and the position of the beam.

Figure 10:
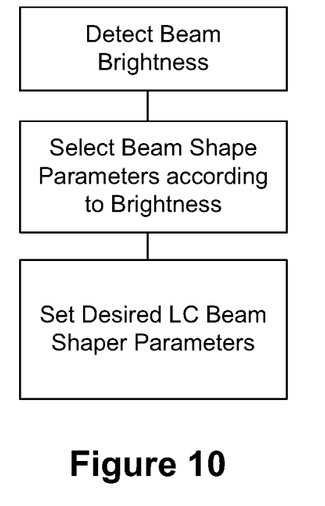
FIG. 10 is a flow diagram illustrating the steps involved in adjusting beam shape according to light source intensity in a device of the type shown in FIG. 9.

As illustrated in FIG. 10, the beam intensity can be detected. This can be done using a photosensor in device 30 or by receiving a signal from a light source intensity controller. A beam divergence value is determined as a function of the variable intensity. This determination can be from a static look-up table (LUT) or it can be a function of a further control parameter that determines how beam divergence should change as a function of beam intensity. In one example, the goal is to ensure that the beam maintains a constant/optimal brightness, so that the area of the beam is controlled by device 30 as the light source intensity is increased to maintain the constant brightness as the light source intensity is increased. Likewise, beam area is reduced as the light source is dimmed. The further control parameter in this example could be the chosen level of constant brightness.

The beam modulation transfer function of the LC beam modulation device can be measured and used to develop the data for the LUT (alternatively the intensity as a function of beam modulation parameter can be approximated using a function whose value is calculated as required instead of storing values in a LUT).

Another application of this device may be the contrast enhancement, when imaging elements are incorporated into the smart illumination systems. In this case, the contrast of acquired images may be improved by adjusting (through a feedback loop) the beam divergence or steering angle.

Figure 11:
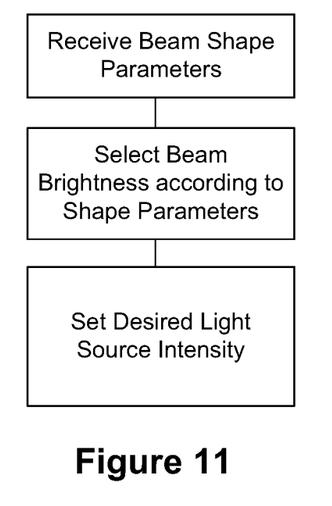
FIG. 11 is a flow diagram illustrating the steps involved in adjusting light source intensity according to beam shape in a device of the type shown in FIG. 9.

As illustrated in FIG. 11, when beam shape is controlled, the goal is to ensure that the beam maintains a constant brightness, so that the light source intensity is increased with the area of the beam as controlled by device 30.

In some embodiments, if the maximum intensity of the light source is reached prior to reaching the maximum beam divergence or beam area, then the device 30 will not be controlled to continue increasing divergence so that the beam intensity does not drop below the desired brightness level.

Figure 12:
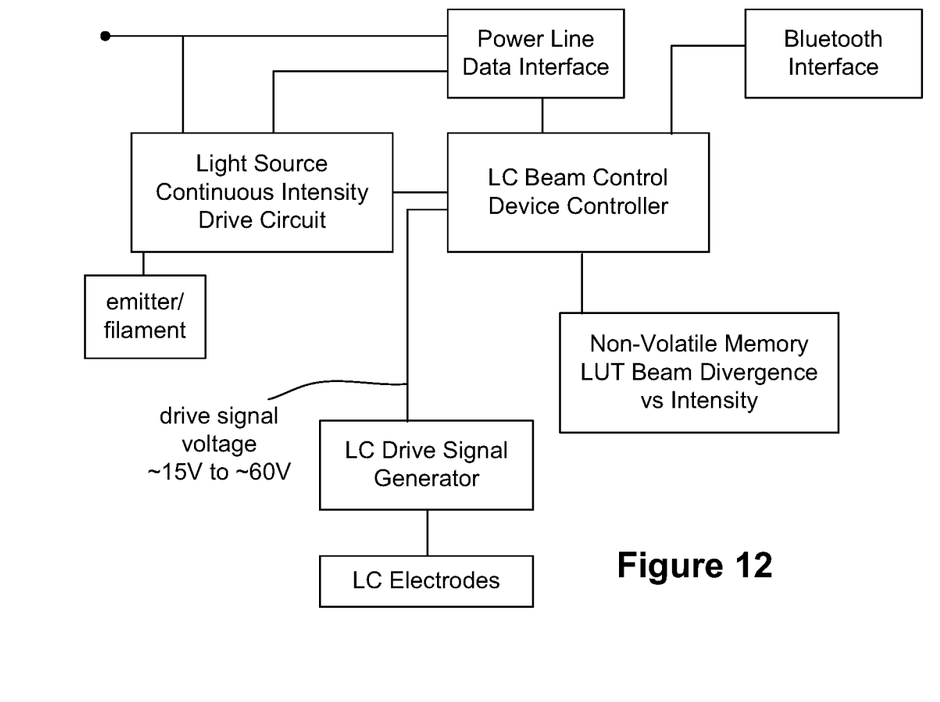
FIG. 12 is an embodiment similar to FIG. 9 in which uniform beam brightness is controlled by an LC device connected by wire to the light source.

In the embodiment of FIG. 12, the beam intensity is not detected, but instead the beam shape and the light source intensity control are calibrated so that the LC beam control and light source intensity control work together. The control over the intensity and beam shape can be provided in a variety of ways. Power line data, power toggling, local infrared, Bluetooth®, or various other ways of communicating a desired intensity or beam shape parameter can be used.

What is claimed is:

1. A liquid crystal (LC) beam modulator having a liquid crystal device and a controller configured to provide a control signal, said LC beam modulator being configured to modulate one of:
   a divergence or a shape of light passing therethrough in response to said control signal, wherein said control signal is responsive to a beam intensity signal to maintain a constant beam brightness as said beam intensity signal varies; and
   said beam intensity signal in response to said control signal to maintain a constant beam brightness as said beam shape varies, wherein said control signal defines a beam shape of a beam passing therethrough.

2. The modulator as defined in claim 1, wherein said beam intensity signal is provided by a detector.

3. The modulator as defined in claim 1, wherein said beam intensity signal is provided by a light source intensity control signal.

4. The modulator as defined in claim 1, wherein said modulator comprises a memory containing parameter values for said LC beam modulator according to said beam intensity signal.

5. The modulator as defined in claim 1, wherein said modulator comprises a processor configured to calculate parameter values for said LC beam modulator according to said beam intensity signal.

6. The modulator as defined in claim 1, wherein said liquid crystal device is configured to modulate a divergence of light and an area or solid angle of said beam and is controlled to maintain a constant beam brightness as said beam intensity signal varies.

7. The modulator as defined in claim 1, further comprising a photovoltaic device for providing power to said modulator, said modulator being a component separate from and to be used with a lighting source or fixture.

8. The modulator as defined in claim 1, comprising a polymer dispersed liquid crystal or a polymer-stabilized liquid crystal device.

9. The modulator as defined in claim 1, comprising layers of nematic liquid crystal having an array of patterned electrodes.

10. In combination, a light source and the liquid crystal (LC) beam modulator as defined in claim 1.

11. The modulator as defined in claim 1, wherein said controller modulates said intensity in response to said control signal defining a solid angle.

12. The modulator as defined in claim 1, wherein said controller comprises a processor configured to calculate said beam intensity according to parameter values for said LC beam modulator.

13. The modulator as defined in claim 1, wherein said controller is configured to maintain a constant beam brightness as said solid angle varies.

14. In combination, a light source and the liquid crystal (LC) beam modulator as defined in claim 2.

15. In combination, a light source and the liquid crystal (LC) beam modulator as defined in claim 3.

16. In combination, a light source and the liquid crystal (LC) beam modulator as defined in claim 7.

17. A liquid crystal beam modulator having a liquid crystal device and a controller configured to provide a control signal, said liquid crystal beam modulator being configured to modulate a divergence or a shape of light passing therethrough in response to said control signal, wherein said control signal is responsive to one of:
   a beam intensity signal provided by a photosensor detector for measuring the light source intensity to maintain a constant beam brightness as said beam intensity signal varies; and
   a beam intensity signal provided by a light source intensity control signal to maintain said beam brightness constant as said electric signal varies.

18. The modulator as defined in claim 17, wherein said liquid crystal beam modulator being configured to modulate a divergence or a shape of light passing therethrough in response to said control signal, wherein said control signal is responsive to a beam intensity signal is provided by a photosensor detector for measuring the light source intensity to maintain a constant beam brightness as said beam intensity signal varies.

19. The modulator as defined in claim 17, wherein said liquid crystal beam modulator being configured to modulate a divergence or a shape of light passing therethrough in response to said control signal, wherein said control signal is responsive to a beam intensity signal is provided by a light source intensity control signal of a light source intensity controller for controlling said light source intensity to maintain said beam brightness constant as said electric signal varies.

20. The modulator as defined in claim 19, wherein said light source intensity control is provided by a dimmer switch.

* * * * *